June 4, 1940.  B. DICK  2,203,082

FLUID PRESSURE MECHANISM

Filed June 10, 1933  2 Sheets-Sheet 1

Inventor
BURNS DICK

By E. E. Huffman
Att'y.

June 4, 1940.                    B. DICK                    2,203,082
                      FLUID PRESSURE MECHANISM
                      Filed June 10, 1933            2 Sheets-Sheet 2

Inventor
BURNS DICK
By E. E. Huffman
Att'y.

Patented June 4, 1940

2,203,082

UNITED STATES PATENT OFFICE 2,203,082

FLUID PRESSURE MECHANISM

Burns Dick, Ferguson, Mo., assignor to Wagner Electric Corporation, St. Louis, Mo., a corporation of Delaware Application June 10, 1933, Serial No. 675,179

3 Claims. (Cl. 60—54.6)

My invention relates to fluid pressure mechanism and more particularly to improvements in the compressor of a fluid pressure transmitting system, as for example, a hydraulic brake system.

Fluid compressors of the type now commonly used in hydraulic brake systems are so constructed that a body of fluid in free communication with the reservoir is maintained at the rear of the piston at all times, whereby fluid may flow past the piston and its packing cup during the return movement of the piston under the action of its return spring. This prevents air from being drawn into the system at the compressor as a result of a vacuum being formed in the pressure system by the fluid not being forced back into the compressor chamber by the brake shoe actuating pistons as rapidly as the piston returns. However, since the body of fluid at the rear of the piston is in free communication with the reservoir, the only force causing fluid to flow past the cup on the return stroke of the piston, is that caused by the vacuum tending to form ahead of the piston. If the normal pressure between the lip of the packing cup and the cylinder, which is not uniform for all cups, is too great to permit sufficiently rapid flow of fluid past the cup under the force caused by the vacuum, then air may be drawn into the system at the brake actuating cylinders unless means for preventing this are provided.

One object of my invention is to provide a compressor with means which will cause fluid from the body of fluid at the rear of the piston to be forced past the compressor piston on its return stroke, thus preventing a vacuum from forming in the fluid pressure chamber.

Another object of my invention is to provide a compressor for a fluid brake system with means for maintaining a small predetermined pressure on the fluid of the system when the piston of the compressor is in its retracted position and at the same time permitting volumetric excesses and deficiencies of the fluid of the system to be compensated for.

Figure 1:
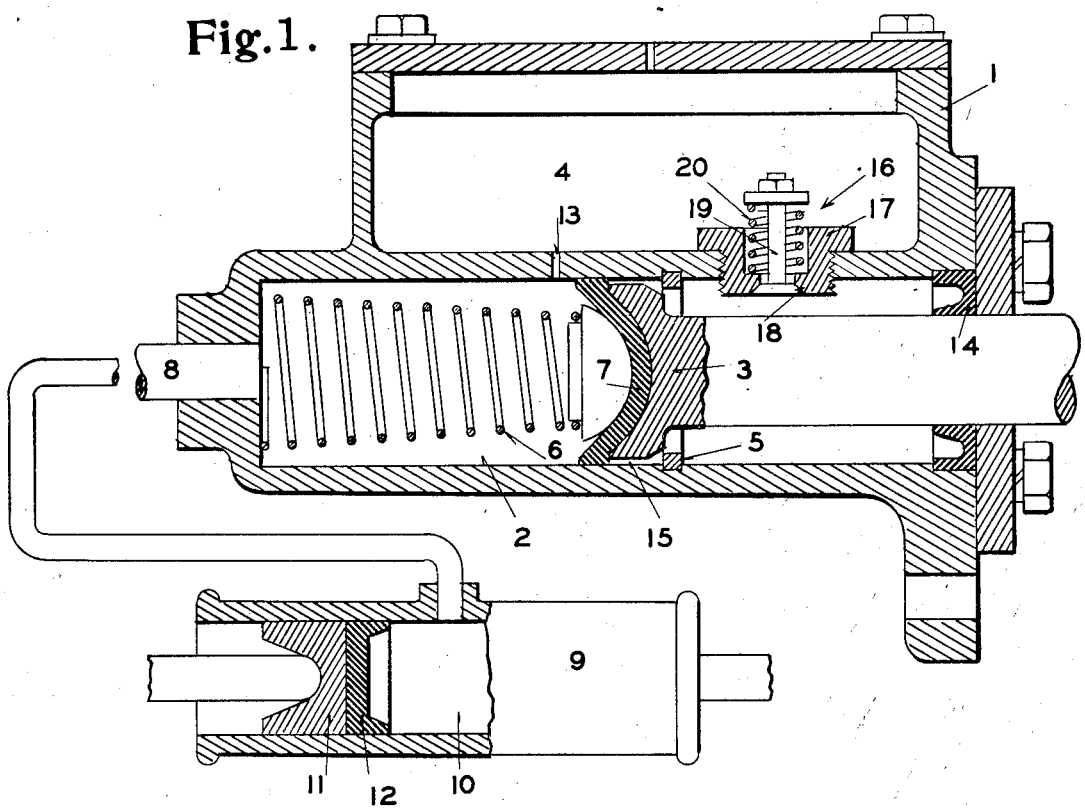
Figure 2:
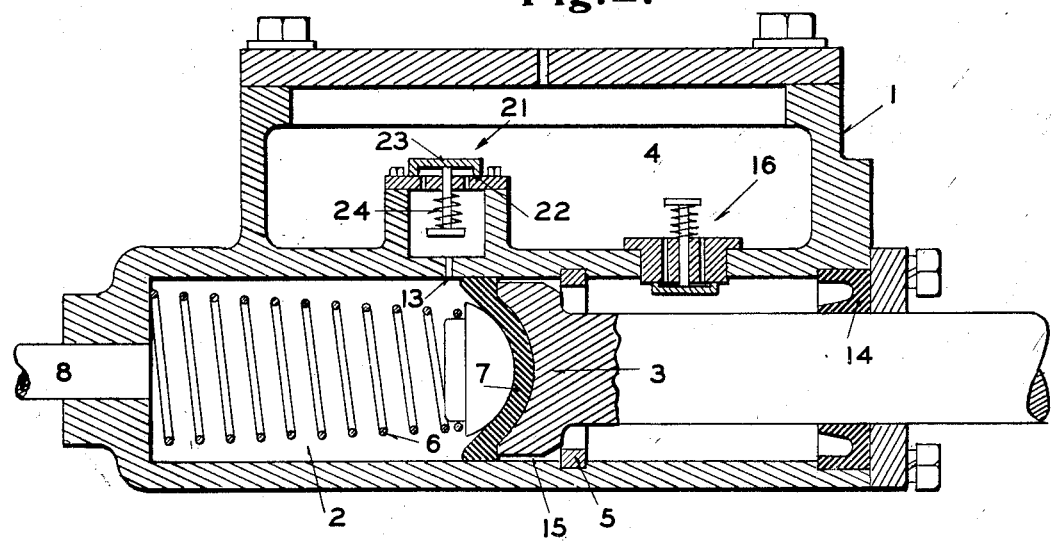
Figure 3:
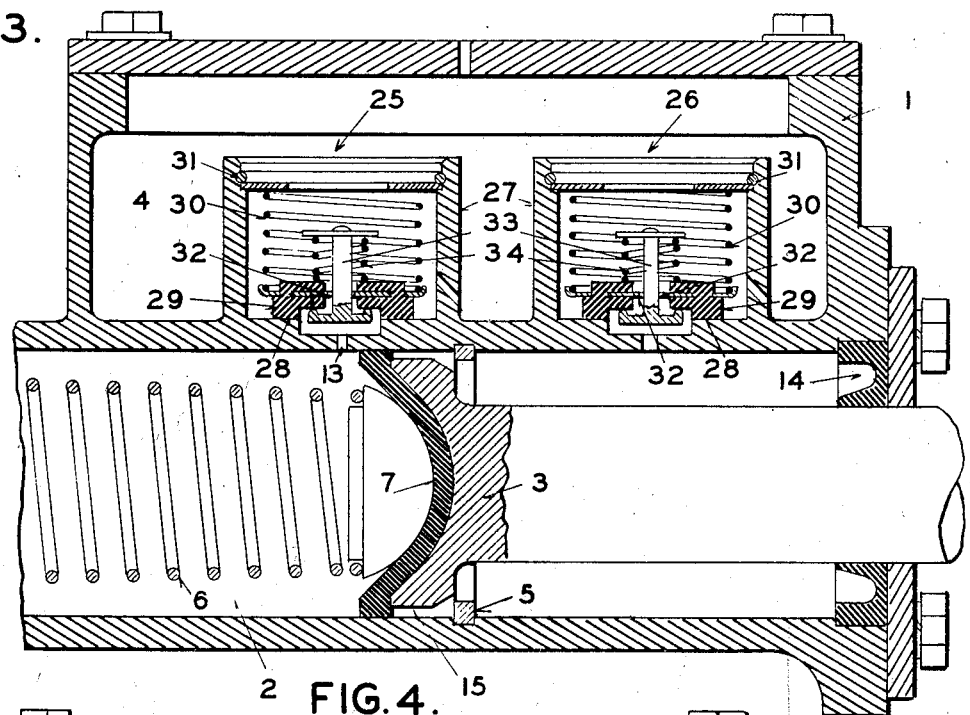
Figure 4:
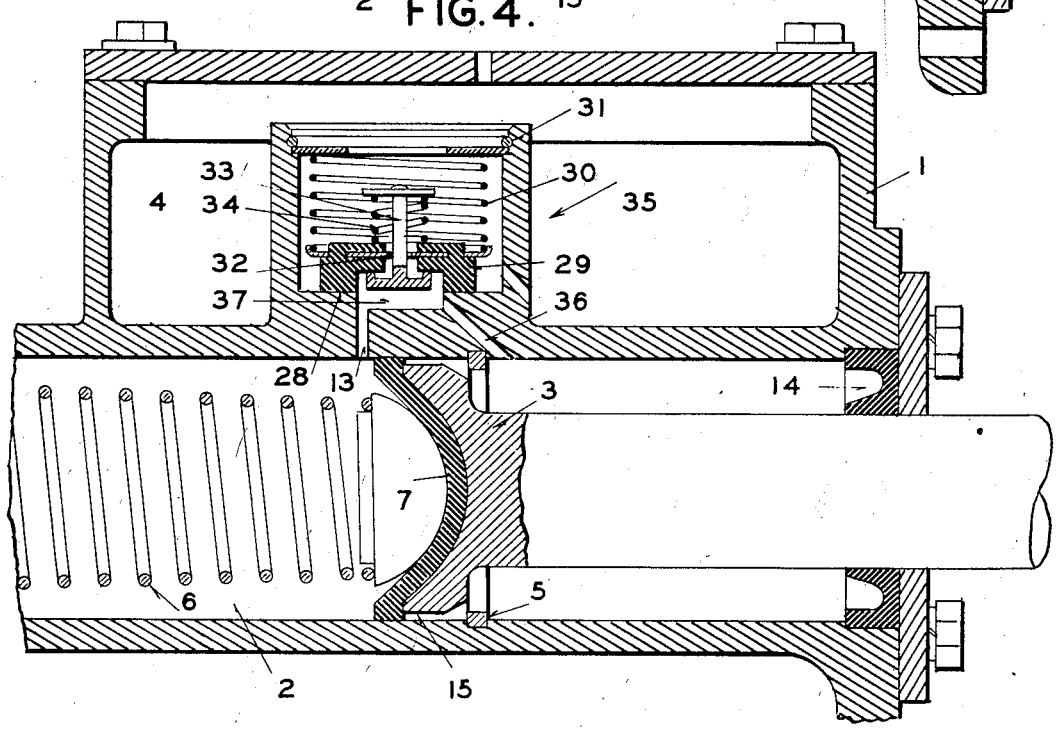

Other objects of my invention will become apparent from the following description taken in connection with the drawings in which Figure 1 is a partial cross sectional view of a compressor and a brake actuating motor of a hydraulic brake system, the compressor being provided with means for causing fluid to be forced into the system on the return stroke of the compressor piston; Figure 2 is a view of the compressor of Figure 1 provided with means for maintaining a small predetermined pressure on the fluid of the system when the piston is in its retracted position; Figure 3 is a view of a modification of the structure of Figure 2; and Figure 4 is a view showing the use of a single valve structure in place of the two-valve structure of Figure 3.

Referring to Figure 1 in detail, the numeral 1 indicates a compressor for a hydraulic brake system, comprising a cylinder 2 a piston 3 reciprocable therein, and a reservoir 4. The piston is biased to its retracted position against the stop 5 by the spring 6 interposed between the end of the cylinder and the piston packing cup 7 on the head of the piston. I prefer to form the head of the piston and the cup as shown and more specifically described in my Patent No. 1,786,231, issued December 23, 1930, although they may assume other forms if desired. The forward end of the cylinder is in communication, by means of a suitable conduit 8, with the brake actuating motors 9 (one only being shown), comprising a cylinder 10 and a pair of oppositely reciprocating pistons 11 each provided with a packing cup 12, all of well known construction.

The piston 3 and its packing cup 7, when in their retracted position, uncover the port 13 providing communication between the reservoir and the cylinder under these conditions. The purpose of the port is to allow expansion and contraction of the fluid in the system and to also compensate for any loss of fluid by leakage past the cups 12 in the motor 9. The rear end of the cylinder through which the piston rod passes, is sealed fluid-tight by suitable packing 14. The piston rod is adapted to be actuated by a pedal or other actuating means.

In prior compressors the chamber formed by the cylinder at the rear of the piston 3 was in free communication with the reservoir 4, whereby a body of fluid would be maintained at the rear of the piston in any position it assumed. On the return stroke of the piston, fluid would be free to flow through the grooves 15 in the piston head and past the lip of the cup to prevent a vacuum from forming ahead of the piston if such piston return movement was more rapid than the return of the fluid from the wheel cylinders. This intended operation was not always present as the pressure between the lip of the cup and the cylinder wall was sometimes too great to permit the fluid to flow past it and, as a result, air would be drawn into the system past the motor pistons 11 if the resiliency of the lips of the cups 12 were destroyed by wear or action of the fluid.

In accordance with my invention, I provide the passage between the reservoir and the chamber at the rear of the piston with a non-return valve 16 permitting fluid to flow only from the reservoir to the chamber. The valve comprises a casing 17 screw-threaded into an opening in the cylinder wall, a seat 18 carried by the casing, and a valve stem 19 having its head biased on the seat by a spring 20. The spring is very light in order to permit the valve to be unseated by a very small difference in pressure of the fluid in the reservoir and chamber.

When the compressor piston is forced forwardly to apply the brakes, the valve 16 will be unseated and fluid from the reservoir will flow into the chamber at the rear of the piston to fill the space created by the piston movement. As soon as the return stroke of the piston begins, the valve will be closed and the action of the piston retracting spring 6 will force the fluid through the piston grooves 15 and past the cup, thereby overcharging the system and preventing the formation of the undesirable vacuum previously referred to. The amount of fluid which will be forced past the piston on its return stroke, will be determined by the volume of the chamber at the rear of the piston which may be varied by varying the ratio of the cylinder and piston rod diameters. The volume of the chamber should be so determined that the amount of fluid forced past the piston on its return stroke under the action of its return spring, is sufficient to maintain the cylinder ahead of the piston full of fluid but not such an amount as will prevent the normal return of the fluid from the brake shoe actuating motors under the action of the brake release springs. During a portion of the return stroke of the piston, some of the fluid at the rear of the piston will pass through the port 13 into the reservoir. Suitable proportioning of the volume of the chamber at the rear of the piston and the size of the port 13, provides for the passage of the required amount of fluid past the piston and voids unduly slow return of the piston. When the piston returns to its retracted position, the excess fluid ahead of the piston passes into the reservoir through the port 13.

Referring to Figure 2, the construction of the compressor is the same as that shown in Figure 1, with an additional non-return valve 21 for the port 13. This valve permits flow of fluid from the cylinder to the reservoir only, and comprises a seat 22 secured on a circular wall surrounding the port 13, and a valve 23 biased onto the seat by a spring 24. The spring is so tensioned that a pressure of, say 8 or 10 pounds per square inch, is necessary to unseat the valve.

With this construction a slight pressure will be maintained in the system when the piston 3 is in its retracted position. This pressure is useful in eliminating loss in piston travel prior to the creation of pressure in the system, and also in assisting to maintain the lips of piston packing cups (both compressor and motors) in pressure engagement with their adjacent cylinder walls when the system is not in operation. If, when the system is not in operation, the fluid should contract, due, for example, to a decrease in temperature, the system will be replenished by the flow of fluid past the piston 3 and the packing cup 7, the valve 16 unseating to allow fluid to flow into the chamber at the rear of the piston. If expansion of the fluid in the system should take place when the system is not in operation, then the valve 21 will be unseated and the excess fluid admitted to the receiver.

In Figure 3 the valves 16 and 21 of Figure 2 are repaced by double valves 25 and 26 respectively. The double valve 25 comprises a circular wall 27 surrounding the passage or port 13 and the valve seat 28. A valve element 29 is biased on the seat 28 by means of a coiled spring 30 held in position by stop 31 at the top of the wall 27. The valve element 29 is provided with a central opening 32 which is controlled by the valve element 33 biased toward closed position by spring 34. The spring 34 for the valve element 33 is weaker than spring 30 for the valve element 29. The valve element 29 permits flow of fluid under pressure from the cylinder to the reservoir, and valve element 34 permits flow of fluid from the reservoir to the cylinder but at a lower pressure.

The double valve 26 controlling the passage between the reservoir and the chamber at the rear of the piston, has the same construction and operation as the double valve 25 just described.

When the piston 3 is operated to apply pressure to the fluid in the cylinder and thus operate the brakes, fluid pressure in the cylinder will be built up prior to the lip of the cup 7 passing the port 13, this pressure being determined by the pressure necessary to unseat valve element 29 of the double valve 25. As the piston moves forwardly, the valve element 33 of the double valve 26 will be unseated and thus permit fluid to flow from the reservoir to the chamber at the rear of the piston.

As soon as the return stroke of the piston begins, the valve element 33 of the double valve 26 will be closed and a pressure will be built up in the chamber at the rear of the piston by the piston retracting spring and brake shoe release springs (not shown). The spring 30 for valve element 29 is of such strength that the pressure in the chamber will be sufficient to cause fluid to be forced past the piston cup 7, overcharging the system and preventing a vacuum from forming ahead of the piston. If the volume of fluid tending to pass the cup is greater than that which is necessary to prevent the formation of the vacuum ahead of the piston, then a high pressure will be developed in the chamber which will be relieved by the opening of the valve element 29, thus permitting the piston to move freely to its retracted position while at the same time maintaining a sufficient pressure in the chamber to force fluid past the cup. When the piston assumes its retracted position the excess fluid in the cylinder passes through port 13 and past valve element 29 of the double valve 25 to the reservoir. The valve element 29, however, maintains a slight positive pressure on the fluid in the cylinder. If the fluid in the cylinder, when the piston is retracted, should contract due, for example, to a leak in the system or to a drop in temperature, the valve element 33 of the double valve 25 will be unseated and the fluid in the cylinder will be replenished. It is thus seen that by this construction the compensation for decrease in volume of fluid in the cylinder is direct from the reservoir instead of by way of valve 16 and the lip of the cup, as in Figure 2.

In Figure 4 the two double valves 25 and 26 have been replaced by a single double valve 35 identical in construction to valves 25 and 26. The passage 13 and the passage 36 leading to the chamber at the rear of the piston are interconnected by a chamber 37 with the double valve 35 controlling communication between said chamber 37 and the reservoir. The operation of this structure is substantially identical with that of Figure 3.

Having fully described my invention, what I claim as new and desire to secure by Letters Patent of the United States is:

1. In fluid pressure mechanism, a cylinder, a piston reciprocable therein, a reservoir, means forming a passage between the reservoir and the cylinder, said passage being uncovered by the piston only when in its retracted position, means forming a fluid containing chamber at the rear of the piston the volume of which varies with the piston movement, means associated with the piston for preventing fluid from passing the piston on its forward stroke but permitting such passage on the return stroke, means forming a passage between the reservoir and the chamber, and valve means for controlling both of said passages, said valve means comprising a valve member for allowing fluid to flow in one direction through each passage when the pressure in that direction is a predetermined value and another valve member for allowing fluid to flow through each passage in the other direction when the pressure in that direction is a lower value.

2. In fluid pressure mechanism, a cylinder, a piston reciprocable therein, a reservoir, means forming a passage between the reservoir and the cylinder, said passage being uncovered by the piston only when in its retracted position, means forming a fluid containing chamber at the rear of the piston the volume of which varies with the piston movement, means associated with the piston for preventing fluid from passing the piston on its forward stroke but permitting such passage on the return stroke, means forming a passage between the reservoir and the chamber, and valve means associated with both of said passages for preventing fluid from flowing therethrough to the reservoir unless the pressure acting in the direction of the reservoir is above a predetermined value but permitting fluid to flow from the reservoir through each passage.

3. In fluid pressure mechanism, a cylinder, a piston reciprocable therein, a reservoir, means forming a passage between the reservoir and the cylinder, said passage being uncovered by the piston only when in its retracted position, means forming a fluid containing chamber at the rear of the piston the volume of which varies with the piston movement, means associated with the piston for preventing fluid from passing the piston on its forward stroke but permitting such passage on the return stroke, means forming a passage between the reservoir and the chamber, and valve means associated with both of said passages for preventing fluid from flowing therethrough to the reservoir unless the pressure acting in the direction of the reservoir is above a predetermined value but permitting fluid to flow from the reservoir through each passage, said valve means comprising a valve seat, a valve member cooperating with the seat and movable thereoff in the direction of flow of fluid toward the reservoir, a spring for normally biasing the valve member seated against the predetermined pressure, said valve member being provided with a passage therethrough, and a check valve carried solely by the valve member and preventing fluid from flowing through the passage in the valve member to the reservoir.

BURNS DICK.